US006535628B2

(12) United States Patent
Smargiassi et al.

(10) Patent No.: US 6,535,628 B2
(45) Date of Patent: *Mar. 18, 2003

(54) DETECTION OF WAFER FRAGMENTS IN A WAFER PROCESSING APPARATUS

(75) Inventors: Eugene Smargiassi, San Jose, CA (US); Wayez R. Ahmad, San Jose, CA (US)

(73) Assignee: Applied Materials, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,665

(22) Filed: Oct. 15, 1998

(65) Prior Publication Data

US 2001/0043735 A1 Nov. 22, 2001

(51) Int. Cl.[7] .................................................. G06K 9/62
(52) U.S. Cl. ........................................ 382/149; 427/124
(58) Field of Search ................................ 382/152, 141, 382/145, 149; 356/390, 394, 237.2, 237.3, 237.1, 237.4, 237.5; 250/559.05, 559.2, 559.39, 559.41, 559.46; 702/40, 82, 134; 438/7–9, 16; 148/215, 508; 427/99, 123, 124, 125; 348/82, 83, 86, 130, 87, 126

(56) References Cited

U.S. PATENT DOCUMENTS

| 4,352,016 A | | 9/1982 | Duffy et al. | 250/358.1 |
|---|---|---|---|---|
| 4,652,757 A | | 3/1987 | Carver | 250/360.1 |
| 4,659,220 A | | 4/1987 | Bronte et al. | 356/237 |
| 4,812,664 A | | 3/1989 | Borden | 250/572 |
| 5,383,018 A | | 1/1995 | Sadjadi | 356/243 |
| 5,446,824 A | * | 8/1995 | Moslehi | 392/416 |

(List continued on next page.)

FOREIGN PATENT DOCUMENTS

| JP | 08-134644 A | * | 5/1996 | ............ C23C/14/52 |
| JP | 64-047866 A | * | 2/1998 | ............ C23C/14/34 |

OTHER PUBLICATIONS

Cognex, MVS–8000 Product Family Software Overview, Cognex Corporation, Lit. #7016–97, 1997.

Cognex, MVS–8100 Series, MVS–8000 Product Family, Cognex Corporation, Lit. #7015–97, 1997.

*Primary Examiner*—Brian Werner
(74) *Attorney, Agent, or Firm*—Pennie & Edmonds LLP

(57) ABSTRACT

During a wafer process, fragments can break away from a wafer. The wafer fragments can compromise the accuracy of the temperature signals generated by sensor probes in a rapid thermal process. In particular, the fragments can attenuate or otherwise interfere with the radiation received from the wafer. This interference can undermine the accuracy of the temperature measurement signal generated by the probes. If the temperature control function is compromised, excessive temperature gradients can result in damage to the wafer, reducing device yield and degrading device quality. To alleviate the effects of wafer fragments, the presence of a wafer fragment is detected. An image acquisition device acquires an image of an area adjacent the sensor probe. A processor analyzes the acquired image to determine whether a wafer fragment is present. One approach involves comparing the acquired image to a reference image taken in the absence of a wafer fragment quantifying the amount of deviation. Another approach involves analyzing the acquired image for optical density contrast changes indicative of the presence of a wafer fragment. Detection of a wafer fragment allows the rapid thermal process to be stopped so that the fragment can be cleared away, either manually or automatically, prior to insertion of the next wafer into the chamber.

37 Claims, 5 Drawing Sheets

U.S. PATENT DOCUMENTS

| | | | |
|---|---|---|---|
| 5,592,295 A | | 1/1997 | Stanton et al. ............... 356/426 |
| 5,598,341 A | | 1/1997 | Ling et al. ............. 364/468.17 |
| 5,618,380 A | | 4/1997 | Siems et al. ................... 438/14 |
| 5,622,595 A | * | 4/1997 | Gupta et al. ................ 438/710 |
| 5,643,404 A | | 7/1997 | Muraoka et al. ......... 156/626.1 |
| 5,659,630 A | | 8/1997 | Forslund ..................... 382/149 |
| 5,660,472 A | * | 8/1997 | Peuse et al. ................ 374/128 |
| 5,708,557 A | * | 1/1998 | Feigenbaum et al. ....... 361/234 |
| 5,708,755 A | | 1/1998 | Gronet et al. ................ 392/416 |
| 5,850,466 A | * | 12/1998 | Schott ........................ 382/141 |
| 5,909,276 A | * | 6/1999 | Kinney et al. .............. 356/237 |
| 5,938,335 A | * | 8/1999 | Yam ........................... 374/124 |
| 6,049,148 A | * | 4/2000 | Nichols et al. ........... 310/68 B |
| 6,064,429 A | * | 5/2000 | Belk et al. .................. 348/128 |
| 6,125,789 A | * | 10/2000 | Gupta et al. ............. 118/723 E |

\* cited by examiner

DETECTION OF WAFER FRAGMENTS IN A WAFER PROCESSING APPARATUS

The present invention relates to processing of wafers and, more particularly, to systems and methods for quality control in deposition processing.

A variety of deposition techniques are available for processing of wafers to fabricate semiconductor devices. Rapid thermal processing (RTP), for example, is widely used in semiconductor fabrication applications in which rapid temperature cycling is necessary or desirable. Examples of common rapid thermal processing applications include annealing, oxidation, and nitridation. A rapid thermal processing chamber typically includes a housing with a support for a wafer to be processed, one or more heat sources, such as lamps, that generate radiation to heat the wafer, and a reflector plate that forms a reflective cavity for more effective heating.

Temperature uniformity is a critical factor in the quality of the rapid thermal process. Different areas of the wafer can exhibit different energy absorption or emissivity characteristics. Moreover, the spatial heating profile of the heat source can be somewhat nonuniform. Consequently, the rapid thermal process can produce significant thermal gradients across the surface of the wafer. Excessive thermal gradients can result in structural damage to the wafer, directly impacting device yield and quality. With flood lamp heat sources, it is often difficult to control cross-substrate temperature. With zoned heat sources, however, temperature can be spatially controlled to more effectively minimize thermal gradients across the wafer.

For spatial control of cross-wafer temperature, particularly with zoned heat sources, a rapid thermal processing chamber typically incorporates a temperature sensing device. The temperature sensing device may include, for example, an array of temperature sensor probes such as pyrometers. The temperature sensing device senses the temperature of the wafer, often at several positions, during the heating cycle. Temperature signals generated by the temperature sensing device are processed to generate control signals for the heat source.

Accordingly, the accuracy of the temperature signals provided by the temperature sensing device is important for effective control of the heat source, and therefore is a significant factor in device fabrication quality and yield. Any inaccuracies in the temperature measurement can undermine the effectiveness of the temperature control function, opening the door for temperature gradients that can damage the wafer being processed.

SUMMARY

The present invention is directed to a system and method for detecting wafer fragments in a wafer processing apparatus. The system and method can be useful in maintaining the accuracy of the temperature control function of a wafer deposition process. In particular, the system and method facilitate the detection of wafer fragments in a deposition processing chamber. Such wafer fragments can adversely affect the accuracy of temperature measurements within the chamber.

The system and method are particularly useful in controlling the quality of a rapid thermal process given the stringent temperature requirements of such a process. The system and method may find ready application, however, in a variety of wafer processes in which the presence of fragments is a concern, and therefore are not limited to rapid thermal processing. Nevertheless, for purposes of illustration, reference will be made to the characteristics of the rapid thermal process in describing an embodiment of the present invention.

During a rapid thermal process, fragments can break away from the wafer and fall onto the temperature sensing device, or onto areas between the device and the wafer such as the reflector plate. The wafer fragments can compromise the accuracy of the temperature signals generated by the temperature sensing device. With pyrometer probes, for example, wafer fragments can fall onto the reflector plate at positions generally coincident with the probes. The wafer fragments can attenuate or otherwise interfere with the infrared radiation received from the wafer.

This interference can undermine the accuracy of the temperature measurement signal generated by the probes, and ultimately degrade the temperature control function across the surface of the wafer. If the temperature control function is ineffective, excessive temperature gradients can result in damage to the wafer, reducing device yield and degrading device quality. Also, the effects of the wafer fragment can persist for subsequent wafers processed within the rapid thermal process chamber unless the fragment is cleared away from the reflector plate.

To alleviate the effects of wafer fragments, in accordance with an embodiment of the present invention, the presence of a wafer fragment over a temperature sensing device such as an array of probes is detected. The presence of a wafer fragment can be detected, for example, using machine vision techniques. An image acquisition device acquires an image of at least a portion of a reflector plate. The acquired image is analyzed to detect the presence of a wafer fragment.

Detection of a wafer fragment allows the rapid thermal process to be stopped so that the fragment can be cleared away. For example, upon detection of a wafer fragment, an advisory can be generated. The advisory may serve as the basis for automated halting of the process, or as a notification to a human operator for manual intervention. By removing the fragment, a potential source of error in the temperature measurement generated by the temperature sensing device can be eliminated before the next wafer is processed. In this manner, the accuracy of the temperature measurement can be maintained, thereby reducing the possibility of excessive temperature gradients that can lead to device yield and quality deficiencies.

In one embodiment, the present invention provides a system for detecting the presence of a wafer fragment in a deposition process chamber, the system comprising an image acquisition device disposed to acquire an image representative of an area between a temperature sensing device and a wafer processing position within the deposition process chamber, and a processor that analyzes the acquired image to detect the presence of a wafer fragment within the area.

In another embodiment, the present invention provides a rapid thermal processing system comprising a process chamber, a wafer mount disposed within the process chamber, a heat source disposed to heat a wafer in the wafer mount, a reflector plate disposed on a side of the wafer mount opposite the heat source, one or more temperature sensor probes disposed proximate to the reflector plate, a viewport allowing visual access to the process chamber, an image acquisition device disposed to acquire an image via the viewport, the image being representative of at least a portion of the reflector plate within the process chamber, and a processor that analyzes the acquired image to detect the presence of a wafer fragment on the reflector plate.

In a further embodiment, the present invention provides a method for detecting the presence of a wafer fragment in a deposition process chamber, the method comprising acquiring an image representative of an area between a temperature sensing device and a wafer processing position within the deposition process chamber, and analyzing the acquired image to detect the presence of a wafer fragment on the surface.

In each of the above embodiments, the acquired image can be analyzed by comparison to a reference image representative of a reflector plate that is substantially free of wafer fragments. In this case, an advisory can be generated in the event the acquired image deviates from the reference image by more than a threshold deviation representative of the presence of a wafer fragment. Alternatively, the acquired image can be analyzed by identifying an optical density contrast change at a position on a surface of the reflector plate, and determining whether a wafer fragment is present based on the contrast change. In either case, the presence of a wafer fragment can be detected using known image processing techniques employed in existing machine vision systems.

Such machine vision techniques can be used to detect the presence of a wafer fragment and, if desired, quantify the size of the fragment. With size information, a size filter can be applied to the detection process. In particular, generation of an advisory can be triggered based on the presence of a wafer fragment that exceeds a size sufficient to adversely affect the temperature control function. In this manner, the presence of very small fragments that are considered unlikely to cause temperature control problems can be discounted based on selection of a size threshold by the process operator.

Other advantages, features, and embodiments of the present invention will become apparent from the following detailed description and claims.

DESCRIPTION OF DRAWINGS

Like reference numbers and designations in the various drawings indicate like elements.

DETAILED DESCRIPTION

Figure 1:
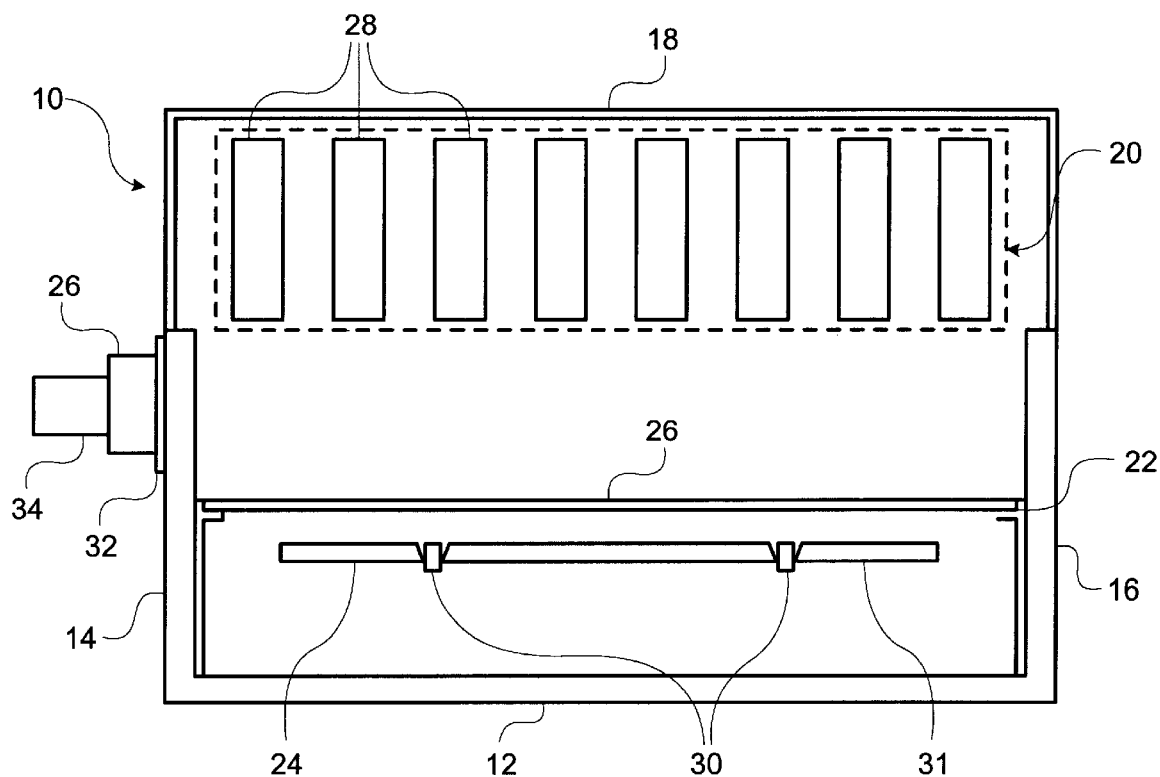
FIG. 1 is side view illustrating a rapid thermal process chamber.

FIG. 1 is a side view of a rapid thermal process chamber 10. As shown in FIG. 1, chamber 10 includes a bottom wall 12, opposing side walls 14, 16, top wall 18, and front and back walls (not shown in FIG. 1). Walls 12, 14, 16, and 18 enclose a heat source 20, a wafer support 22, and a reflector plate 24. FIG. 1 further illustrates a wafer 26 mounted on wafer support 22. Although a single wafer 26 is shown for purposes of example, rapid thermal process chamber 10 may be designed for the processing of two or more wafers. Chamber 10 may include other conventional equipment commonly used in rapid thermal processing applications. Such equipment may include, for example, pump equipment for evacuating chamber 10, gas distribution lines for delivery of process gas into the chamber, and various fixtures for supporting heat source 20 and reflector plate 24.

Heat source 20 may take the form of a flood lamp source or, as shown in FIG. 1, an array of lamp sources 28. Lamp sources 28 can be arranged in a two-dimensional array and individually controlled to allow zoned heating of the surface of wafer 26. An example of a rapid thermal processing system incorporating spatially zoned lamp sources is disclosed in U.S. Pat. No. 5,155,336 to Gronet et al., the entire content of which is incorporated herein by reference. Each lamp source 28 can be fixtured within a reflective zone to concentrate heat onto wafer 26. Heat generated by heat source 20 is absorbed by wafer 26 during processing. Reflector plate 24 forms a reflective cavity to reflect heat back onto wafer 26 and provide more effective heating.

To facilitate control of heat source 20, chamber 10 further includes a temperature sensing device. For example, chamber 10 may include one or more temperature sensor probes 30 that sense temperature at different positions across wafer 26. Two sensor probes 30 are illustrated in FIG. 1 for ease of illustration. Sensor probes 30 may take the form of pyrometers that transduce infrared radiation emitted by wafer 26 into temperature signals. An example of such a temperature measurement system is disclosed in U.S. Pat. No. 5,660,472 to Peuse et al., the entire content of which is incorporated herein by reference. Alternatively, chamber 10 could incorporate an infrared camera, discrete thermocouples, thin film thermocouples, or other temperature sensing devices appropriate for measurement of temperature across the surface of wafer 26. The use of pyrometer-based sensor probes 30 will be described herein.

The temperature signals generated by sensor probes 30 can be fed back to a controller (not shown) that adjusts the intensities of individual lamp sources 28 to produce a desired spatial heating profile and thereby minimize thermal gradients across the surface of wafer 26. Each sensor probe 30 can be mounted adjacent a lower surface 31 of reflector plate 24 or, as shown in FIG. 1, integrated with the reflector plate. In either case, sensor probes 30 detect infrared radiation emitted from wafer 26 mounted on wafer support member 22. Each sensor probe 30 is positioned to monitor temperature within a particular area of wafer 26. An array of sensor probes 30 can be provided to span the entire surface area of wafer 26. In many applications, however, disposition of sensor probes 30 within certain sub-sections of reflector plate 24, or with irregular patterns, may provide information sufficient for the temperature control function, particularly for zoned lamp sources exhibiting a predetermined spatial heating profile for a given application.

During the rapid thermal process, fragments can break away from wafer 26, and fall onto surfaces, such as reflector plate 24, positioned between the wafer processing position and temperature sensor probes 30. The wafer fragments generally result from thermal gradients at the outer edge of wafer 26. Unfortunately, the wafer fragments can compromise the accuracy of the temperature signals generated by sensor probes 30, especially when the fragments fall onto reflector plate 24 at positions generally coincident with the probes. In particular, the fragments can land at positions between sensor probes 30 and wafer 26, interfering with the temperature signal received by the probes. This fragment-induced interference can attenuate or otherwise corrupt the temperature measurement signal, and adversely affect the temperature control function across the surface of wafer 26. Excessive temperature gradients can damage wafer 26, reducing device yield and degrading device quality. Also, the effects of the wafer fragments can persist for subsequent wafers processed within chamber 10 unless the fragment is cleared away from reflector substrate 24. In other words, a wafer fragment that breaks away from a single wafer could result in damage to an entire process run involving many subsequent wafers.

To alleviate the potential effects of wafer fragments, in accordance with an embodiment of the present invention, rapid thermal process chamber 10 incorporates a system for detection of wafer fragments. In particular, chamber 10 may include a viewport 32 and an image acquisition device such as a charge coupled device (CCD) video camera 34. Viewport 32 can take the form of a window mounted in a side wall 14 of chamber 10. Camera 34 can be mounted to viewport 32, and oriented to capture a surface disposed between wafer support 22 and temperature sensor probes 30. In one embodiment, camera 34 is oriented to capture a substantial portion of reflector plate 24 within its field of view. Camera 34 acquires a perspective areal view of at least a portion of a top surface 35 of reflector plate 24. In other words, camera 34 acquires a view of a portion of the surface area of top surface 35 from a perspective angle. If desired, the image can be corrected for perspective distortion by an optical lens system or by matrix manipulation of the image data in software. Camera 34 may take the form of a two-dimensional camera or a line scan camera, but preferably is capable of capturing a two-dimensional image to allow detection of the cross-sectional height of a wafer fragment. Thus, a line scan camera may require a pan or tilt mechanism to allow acquisition of an image in two dimensions.

To facilitate acquisition of the image, chamber 10 can be illuminated either by driving lamp source 20 to generate illuminating radiation or by activating a separate illumination source within the chamber. A fiber optic bundle could be provided as a separate illumination source, and oriented to transmit light from a lamp source and through viewport 32 alongside camera 34. In many applications, it will be desirable to obtain the image following exit of wafer 26 from chamber 10 so that the wafer does not obscure the field of view of camera 34 or block the illuminating radiation from either lamp source 20 or a separate illumination source. As shown in FIG. 1, camera 34 and viewport 32 can be arranged at an elevation above wafer 26 and reflector plate 24 to capture an upper surface of the reflector plate within its field of view.

In one embodiment, the image acquired by camera 34 is compared to a reference image to identify any wafer fragments. The reference image can be acquired when process chamber 10 is generally free from wafer fragments. In this manner, the reference image can be referred to as a "clean" image, taken following cleaning of reflector plate 24 and prior to initiation of the rapid thermal process. By comparing the subsequent, actual image to the reference image and analyzing any deviation, the presence of a wafer fragment can be detected. The comparison can be carried out, for example, using conventional subtractive image processing as employed in existing machine vision systems. In this case, the reference and actual images can be compared on a pixel-by-pixel basis to identify optical density differences. Substantial differences in pixel density over a significant number of pixels may be indicative of the presence of a wafer fragment. The pixel difference can be analyzed across the entire image to quantify an overall deviation.

As an alternative, pixel differences can be logged within a pixel line or column and between adjacent lines or columns. In other words, a group of adjacent pixels exhibiting optical density differences can be considered to quantify a cross-sectional area or width and height dimensions of an individual wafer fragment. In either case, the amount of deviation can be compared to an applicable predetermined threshold indicative of the presence of a wafer fragment. The threshold can be determined by experimentation to exclude false positive detection results, particularly in light of perspective distortion, varying reflectivity due to fragment orientation, and lighting variations within the chamber. If false positives persist, it may be necessary to re-acquire the reference image. In this manner, the fragment detection process is recalibrated for changing conditions within process chamber 10.

In another embodiment, the actual image acquired by camera 34 can be analyzed for optical density contrast changes. Instead of comparing the actual image to a reference image, the acquired image itself is analyzed. Proceeding on a pixel-by-pixel basis, for example, areas above reflector plate 24 in which no wafer fragment is present will yield a given range of optical density. In those areas in which a wafer fragment is present, however, the pixels will exhibit a different range of optical density. Thus, by analyzing contrast changes along a line of pixels, the potential presence of a wafer fragment can be detected. The analysis can proceed by logging subsequent pixels following the contrast change until another contrast change is detected. In this manner, the length of a potential fragment can be determined. Again, the contrast changes can be logged within a pixel line or column and between adjacent lines or columns to quantify the cross-sectional area or width and height dimensions of an individual wafer fragment. If the size, width, or length of an area exhibiting different optical density is substantial and exceeds a predetermined threshold, presence of a wafer fragment on reflector plate 24 can be indicated.

Figure 2:
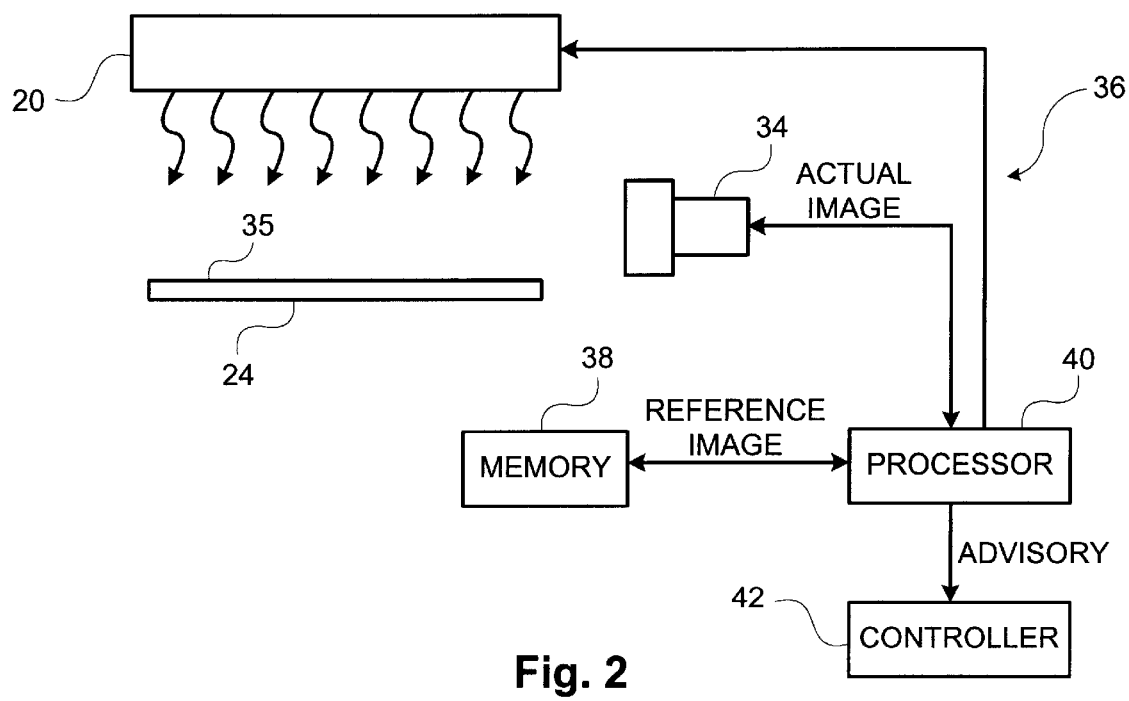
FIG. 2 is a functional block diagram of a system for detecting wafer fragments in a rapid thermal process chamber.

FIG. 2 is a functional block diagram of a system 36 for wafer fragment detection in accordance with an embodiment of the present invention. As shown in FIG. 2, system 36 includes camera 34, a memory 38, a processor 40 and, optionally, a controller 42. Processor 40 executes program code arranged to carry out a wafer fragment detection process. Under control of processor 40, for example, camera 34 acquires an image of a portion of reflector plate 24 at a time when the plate is in a "clean" condition, i.e., when the plate is known to be generally free of wafer fragments. Processor 40 stores the "clean" image in memory 38 as a reference image. The field of view of camera 34 includes at least a top surface 35 of reflector plate 24 on which wafer fragments can collect. For each wafer processed by chamber 10, processor 40 drives camera 34 to acquire another "actual" image representative of at least a portion of reflector plate 24. Simultaneously with acquisition of the image, processor 40 can drive heat source 20 to illuminate the interior of process chamber 10. Consequently, no additional source of illumination is necessary for acquisition of the image. As mentioned previously, however, a separate illumination source could be provided for illumination via viewport 32. As a further option, a monitor can be provided to enable an operator to view the acquired image.

Processor 40 compares the actual image to the reference image. If the actual image deviates from the reference image by more than a predetermined threshold, processor 40 generates an advisory. The advisory can be communicated to an operator for human intervention or, optionally, to a controller 42 that automatically intervenes in the rapid thermal process workflow. For example, controller 42 can halt the rapid thermal process for manual or automated cleaning of reflector plate 24 prior to insertion of the next wafer into chamber 10. If desired, the advisory also may include information indicating the estimated size and number of any wafer fragments for consideration by the operator or for logging to a file for later analysis. This information also may convey the position of the wafer fragment, along one or both dimensions of reflector plate 24. All of the above information can be communicated to the user in graphic and/or text format.

In accordance with another embodiment, system 36 can be modified to dispense with acquisition and storage of a reference image in memory 38. Instead, processor 40 executes program code arranged to carry out an alternative mode of wafer fragment detection. In particular, as described above, the program code is arranged such that processor 40 analyzes optical density contrast changes within the image acquired by camera 34. If the optical density contrast analysis indicates the presence of a wafer fragment on reflector plate 24, processor 40 generates an advisory. Again, the advisory can be communicated to the operator for manual intervention or to controller 42 for automatic intervention. In either case, the rapid thermal process can be halted prior to acceptance of the next wafer in chamber 10. Also, the advisory may include information indicating the estimated size and number of any wafer fragments, as well as fragment position, if desired.

Figure 3:
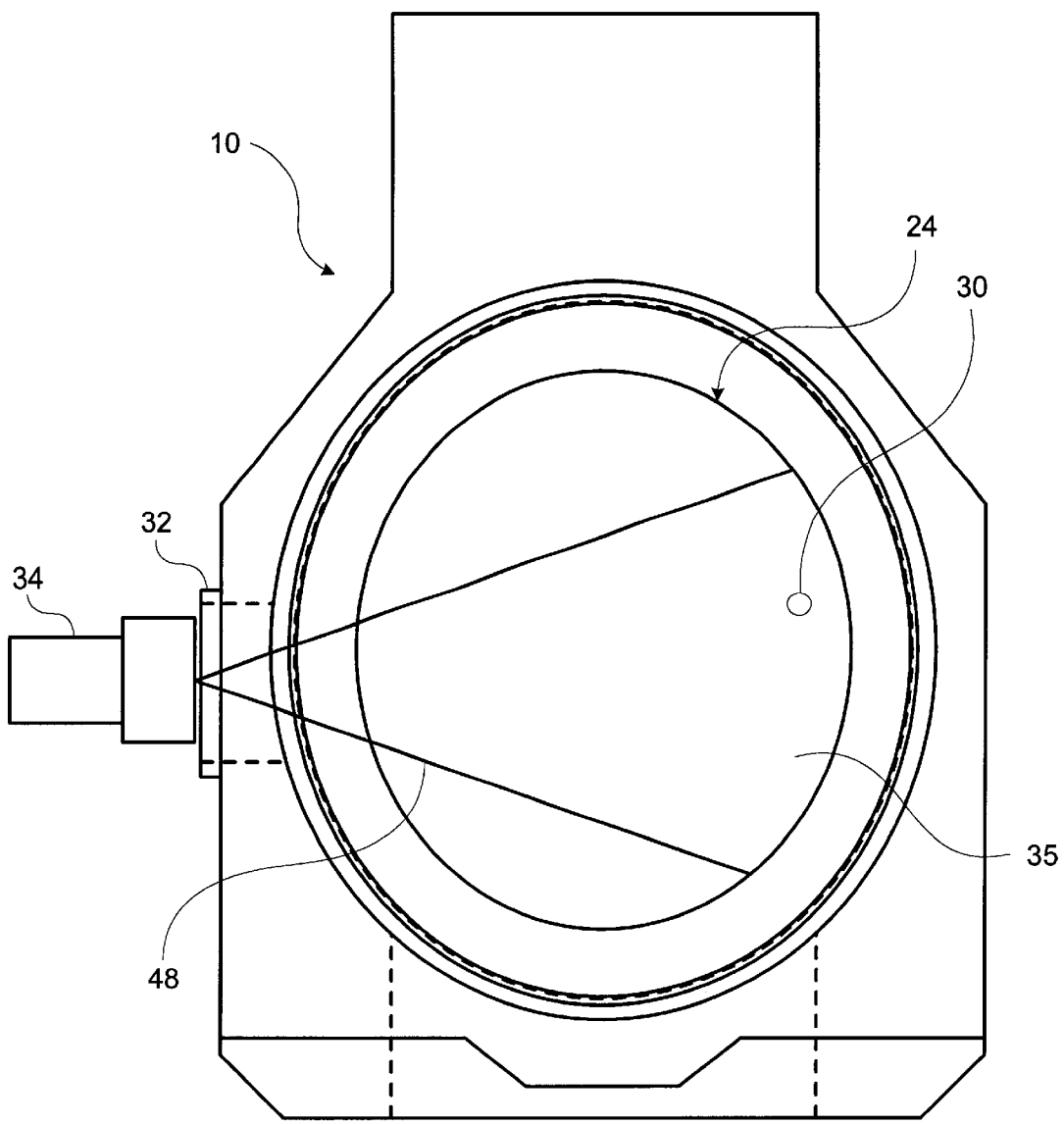
FIG. 3 is a top view illustrating operation of an image acquisition device for detecting wafer fragments on a reflector plate in a rapid thermal process chamber as shown in FIG. 1.
Figure 4:
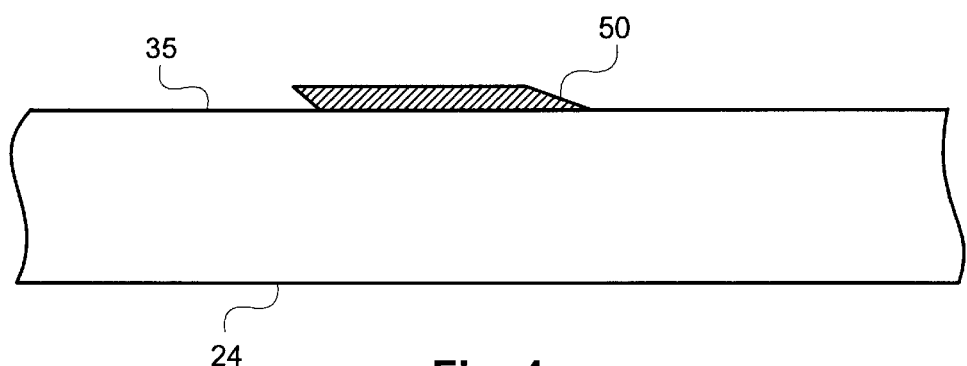
FIG. 4 is a side view of a reflector plate as shown in FIG. 3.

FIG. 3 is a top view illustrating the operation of camera 34. As shown in FIG. 3, camera 34 is oriented to acquire a perspective areal image of at least a portion of reflector plate 24. In particular, camera 34 has a lateral field of view 48 that extends across a portion of top surface 35 of reflector plate 24. FIG. 4 illustrates a side view of reflector plate 24 including the presence of a wafer fragment 50 on top surface 35 of reflector plate 24.

In many applications, it will be sufficient that field of view 48 include only a portion of reflector plate 24. For example, sensor probes 30 can be positioned within a sub-section of reflector plate 24, rather than across the entire surface area of plate 24 consistent with a spatial temperature profile of heat source 20. Consequently, the orientation of camera 34 to capture only those portions of reflector plate 24 commensurate with the positions of sensor probes 30 may be sufficient to identify the wafer fragments that are most likely to impact the accuracy of the temperature signals generated by the probes. In this case, other wafer fragments could be excluded from consideration as being less detrimental to the temperature control function. In the event that the positions of sensor probes 24 extend over a larger area of reflector plate 24, however, camera 34 can be arranged to cover that larger area. For example, camera 34 can be equipped with a lens suitable for a wider angle of view. Alternatively, an actuator can be provided to pan camera 34 across a larger area.

Figure 5:
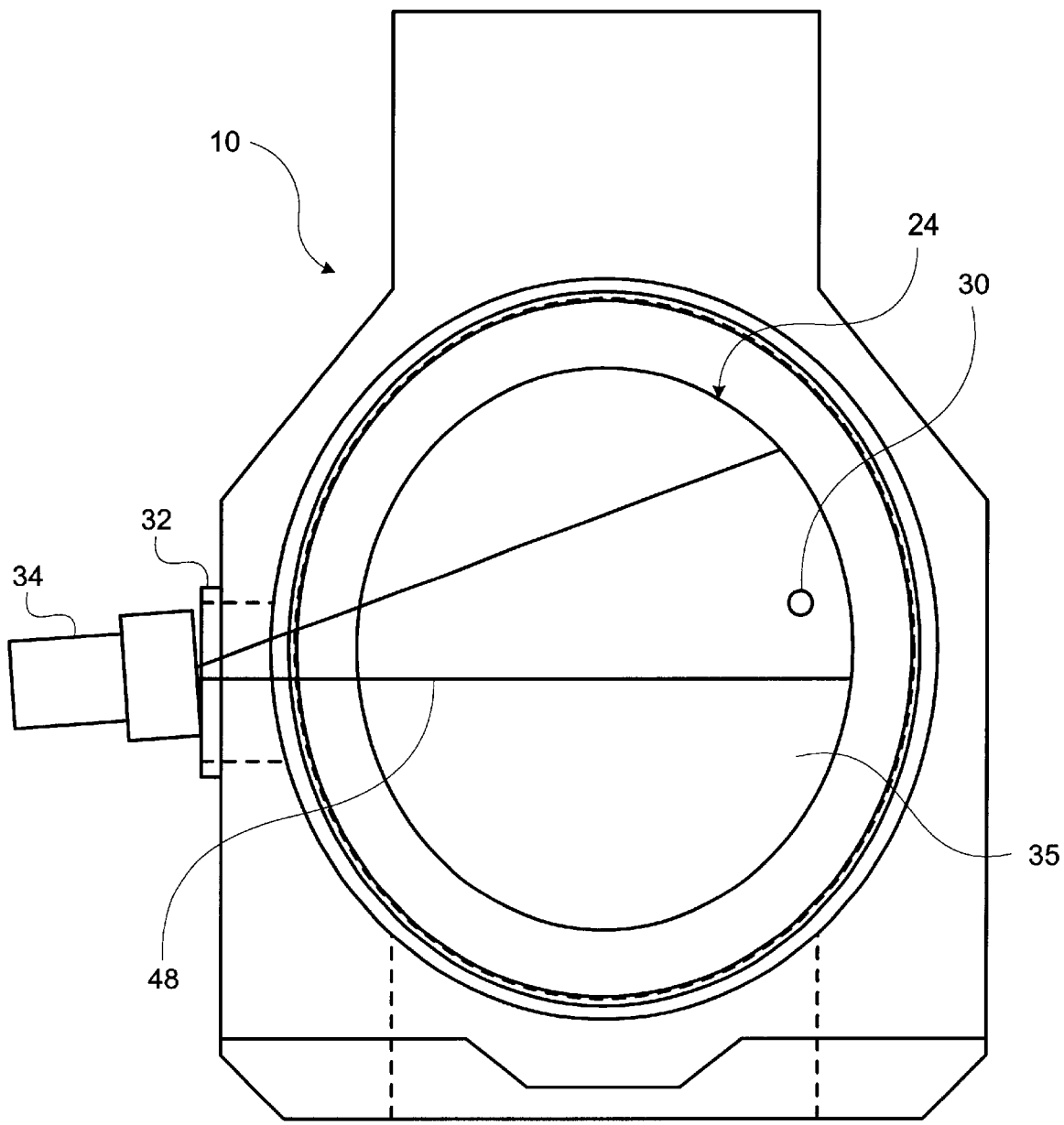
FIG. 5 is a top view illustrating further operation of an image acquisition device as shown in FIG. 3.

FIG. 5 is a top view illustrating further operation of camera 34 in a pan mode. In particular, as shown in FIG. 5, the lateral angle of camera 34 relative to viewport 32 can be adjusted to redirect the field of view 48 across different areas of reflector plate 24. In this manner, camera 34 can cover all areas in which sensor probes 30 are positioned despite a limited field of view, and thereby allow detection of wafer fragments in such areas. In one embodiment, successive images spanning different areas of reflector substrate can be used to form a set of reference images that are compared to a set of actual images taken in the same areas. Each actual image is compared to a corresponding reference image to ascertain the amount of deviation. Alternatively, the successive images conceivably could be integrated to form a composite reference image for comparison with a composite actual image. In another embodiment, a set of actual images could be analyzed individually or in a composite manner for optical density contrast changes indicative of the presence of wafer fragments.

Figure 6:
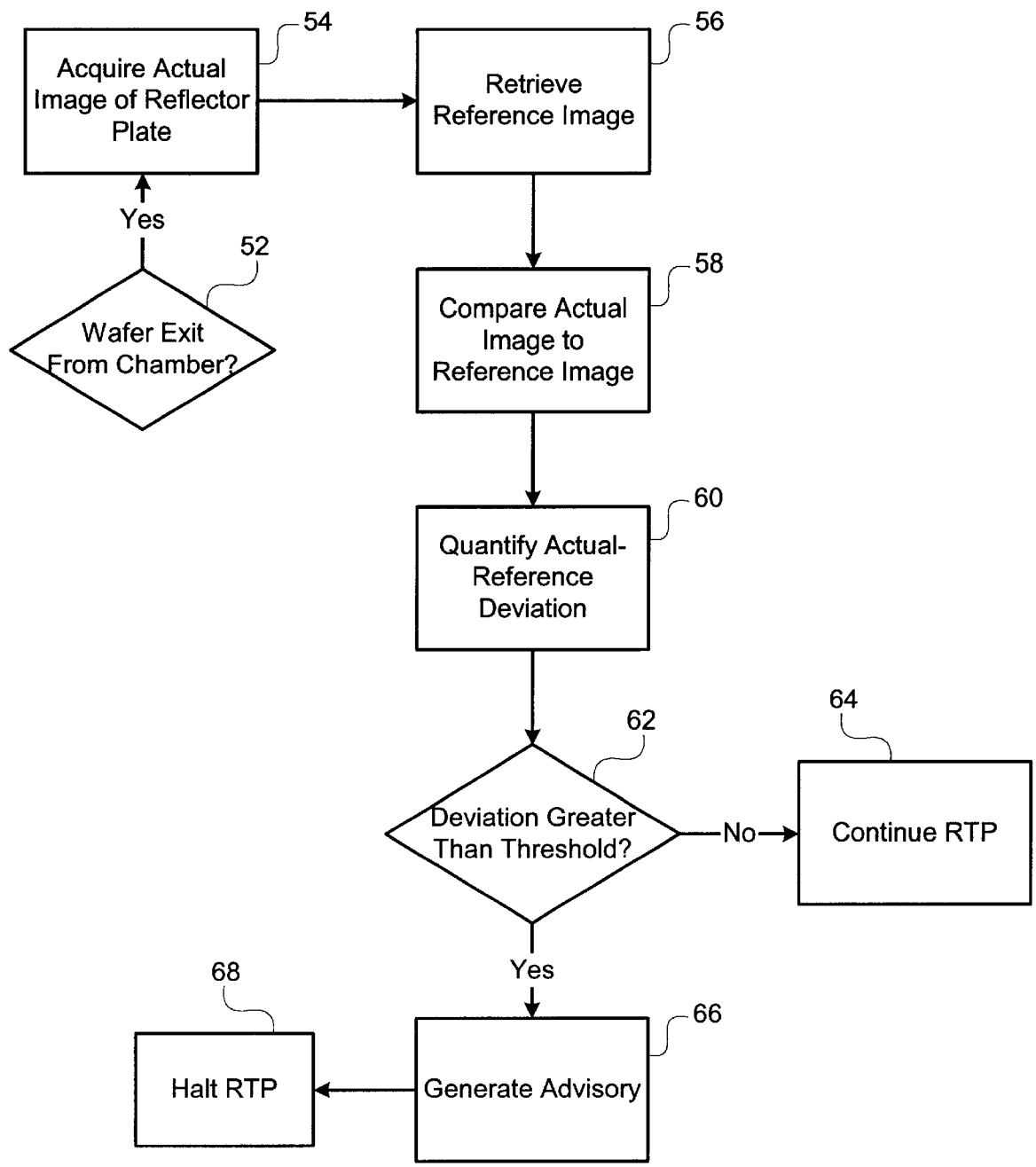
FIG. 6 is a flow diagram illustrating a technique for detecting wafer fragments in a rapid thermal process chamber.

FIG. 6 is a flow diagram illustrating a technique for detecting wafer fragments in a deposition process chamber, such as a rapid thermal process chamber, in accordance with an embodiment of the present invention. As indicated by block 52, processor 40 waits for the completion of a rapid thermal process cycle relative to a particular wafer 26. Upon exit of the wafer 26 from rapid thermal process chamber 10, processor 40 drives camera 34 to acquire an actual image of reflector plate 24, as indicated by block 54. At the same time, processor 40 may drive heat source 20 or a dedicated illumination source to illuminate the interior of chamber 10. Processor 40 then retrieves a previously acquired reference image from memory 38, as indicated by block 56, and compares the actual image to the reference image, as indicated by block 58. Processor 40 quantifies the deviation of the actual image relative to the reference image, as indicated by block 60. Then, as indicated by block 62, processor 40 determines whether the amount of deviation exceeds an applicable predetermined threshold, as indicated by block 62. If not, the rapid thermal process continues and the next wafer is loaded into chamber 10, as indicated by block 64. If so, processor 40 generates an advisory, as indicated by block 66. The advisory may serve as the basis for manual or automatic intervention to halt the rapid thermal process, as indicated by block 68, to allow the removal of wafer fragments.

The comparison of the actual and reference images can be made using well known machine vision techniques, such as image subtraction. Machine visions systems capable of implementing image subtraction techniques are available from Cognex Corporation of Natick, Mass. An example of a suitable machine vision system is the Cognex Checkpoint 600 system, which includes a set of PC-based machine vision hardware and software tools. With such a system, the actual and reference images can be compared on a pixel-by-pixel basis to evaluate optical density differences. The optical density differences can be determined by subtracting the optical density value of the reference pixel from the optical density value of the actual pixel. If the optical density differs by more than a threshold value, the pixel can be recorded as a deviation.

By counting the number of deviating pixels, the overall deviation can be quantified. The pixel count can be calculated for the entire actual image, and compared to a threshold pixel count value for identification of a wafer fragment. Alternatively, separate pixel counts can be calculated for groups of adjacent pixels, e.g., in adjacent lines and columns, and compared to the threshold pixel count. According to this latter approach, pixel differences indicative of individual wafer fragments can be used as the basis for comparison against a threshold representative of a particular fragment size. In the event an individual pixel count or an overall pixel count, as applicable, exceeds a predetermined threshold, processor 40 detects the potential presence of a wafer fragment and generates the advisory.

To implement a subtractive image processing technique, as described above, processor 40 may take the form of any conventional general purpose single- or multi-chip microprocessor such as a Pentium® processor, a Pentium Pro® processor, an 8051 processor, a MIPS processor, a Power PC® processor, or an Alpha® processor. Alternatively, processor 40 may take the form of a special purpose microprocessor embedded within a dedicated machine vision system. In the exemplary Cognex Checkpoint 600 system described above, processor 40 may be a Pentium® processor. In any event, processor 40 executes program code arranged to carry out conventional image processing for the comparison of the actual and reference images. As a further alternative, processor 40 could take the form of a custom logic circuit arranged to execute a wafer fragment detection process as described herein.

Camera 34 may take the form of a two-dimensional CCD pixel array having lateral and vertical fields of view that span multiple pixels, or a line scan camera with a panning mechanism. In this manner, the reference and actual images provide multiple pixel rows and columns for quantification of both the widths and lengths of fragments for comparison to a threshold pixel count. Thus, an overall deviation threshold value can be established by reference to a total number of deviating pixels in the image. Alternatively, deviating pixels can be grouped according to proximity within adjacent columns and rows, thereby quantifying the overall cross-sectional size of individual wafer fragments. In this case, the deviation threshold value is established with respect to a maximum size tolerance for wafer fragments.

Figure 7:
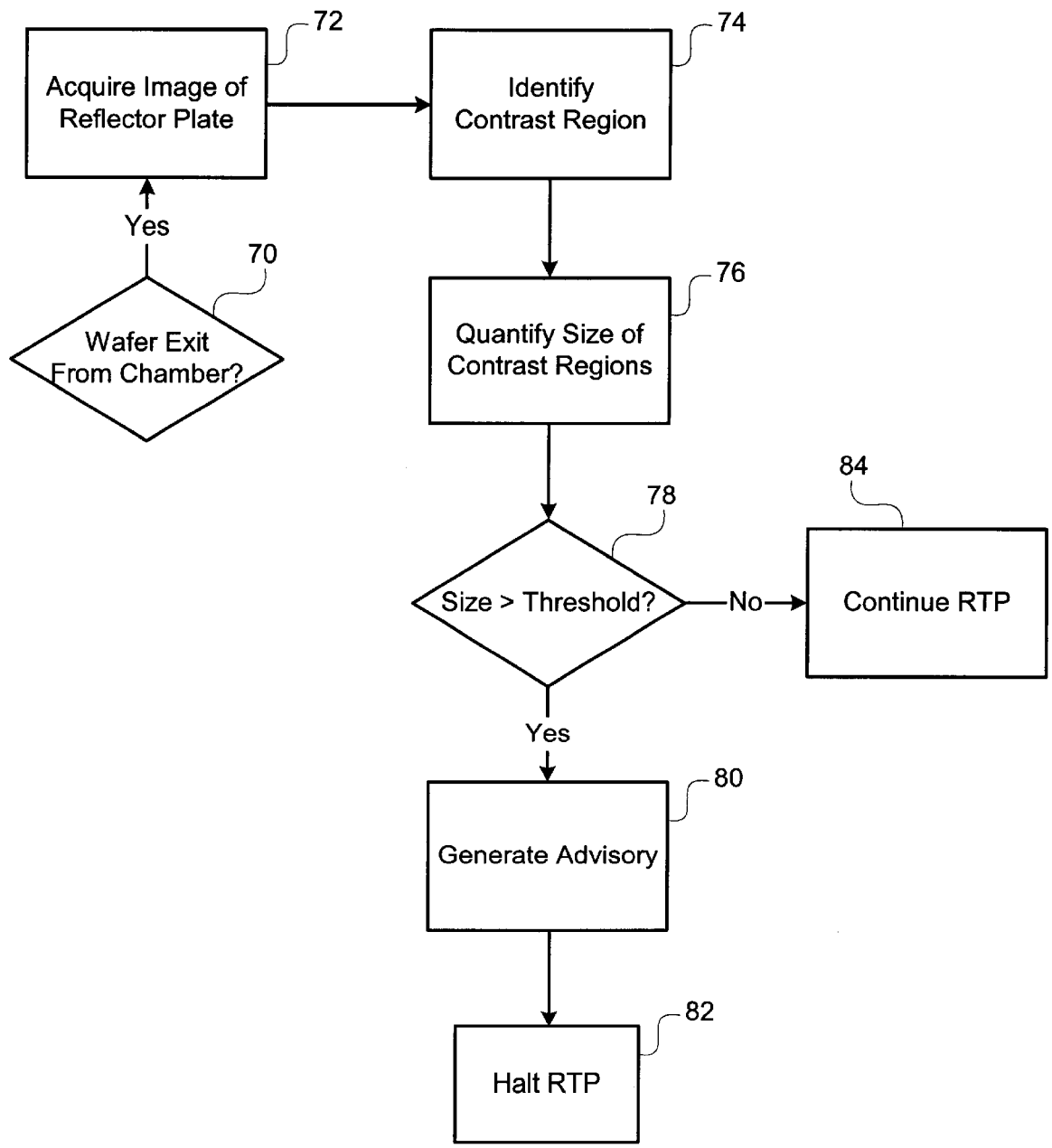
FIG. 7 is a flow diagram illustrating another technique for detecting wafer fragments in a rapid thermal process chamber.

FIG. 7 is a flow diagram illustrating a technique for detecting wafer fragments in a deposition process chamber, such as a rapid thermal process chamber, in accordance with another embodiment of the present invention. As in the process outlined in FIG. 6, processor 40 waits for the completion of a rapid thermal process cycle relative to a particular wafer 26, as indicated by block 70. Upon exit of the wafer 26, processor 40 drives camera 34 and heat source 20 to acquire an actual image of reflector plate 24, as indicated by block 72. Processor 40 then analyzes the acquired image for optical density contrast changes, as indicated by block 74. Then, processor 40 quantifies either the overall size of the contrast regions or the sizes of individual regions, as indicated by block 76. Processor 40 determines whether the size exceeds a predetermined threshold, as indicated by block 78. If so, processor 40 generates an advisory and optionally halts the rapid thermal process for the next wafer until the wafer fragment is cleared, as indicated by blocks 80 and 82. If the size does not exceed the threshold, processor 40 generates no advisory and the rapid thermal process continues, as indicated by block 84. A contrast analysis, like the image substraction analysis, can be implemented using well known machine vision applications, such as those marketed by Cognex Corporation. Again, the Cognex Checkpoint-600 system may serve as a suitable platform for implementation of an image contrast analysis as described herein. Alternatively, this approach can be implemented using any of a variety of general or special-purpose processors or logic circuitry as described above.

The foregoing detailed description has been provided for a better understanding of the invention and is for exemplary purposes only. Modifications may be apparent to those skilled in the art without deviating from the spirit and scope of the appended claims.

What is claimed is:

1. A system for detecting the presence of a wafer fragment, which has broken away from a wafer during processing of the wafer in a deposition process chamber, the system comprising:

an image acquisition device disposed to acquire an image representative of a surface between a temperature sensing device and a wafer processing position within the deposition process chamber upon exit of the wafer from the deposition process chamber; and a processor that analyzes the acquired image to detect the presence of the wafer fragment on the surface.

2. The system of claim 1, wherein the deposition process chamber is a rapid thermal process chamber.

3. The system of claim 2, wherein the rapid thermal process chamber includes a reflector plate, and the acquired image is representative of at least a portion of the reflector plate.

4. The system of claim 3, wherein the processor is configured to generate an advisory in the event the presence of a wafer fragment is detected.

5. The system of claim 4, wherein the processor is configured to compare the acquired image to a reference image, the processor generating the advisory in the event the acquired image deviates from the reference image by more than a threshold deviation representative of the presence of a wafer fragment.

6. The system of claim 5, wherein the threshold deviation is representative of the presence of a wafer fragment having a size that exceeds a threshold size.

7. The system of claim 5, wherein the act of comparing includes comparing the acquired image to the reference image on a pixel-by-pixel basis, and calculating an amount of the deviation based on differences between corresponding pixels in the acquired image and the reference image.

8. The system of claim 4, wherein the processor is configured to analyze the acquired image by identifying an optical density contrast change at a position within the imaged area, and determine whether a wafer fragment is present within the imaged area based on identification of the optical density contrast change.

9. The system of claim 4, wherein the processor is further configured to halt operation of the rapid thermal process chamber upon generation of the advisory.

10. The system of claim 3, wherein the chamber includes one or more temperature sensor probes disposed proximate the reflector plate, and the image acquisition device is oriented such that the acquired image is representative of at least a portion of the reflector plate proximate the temperature sensor probes within the rapid thermal process chamber, the acquired image being indicative of potential presence of a wafer fragment between the temperature sensor probes and the wafer processing position.

11. The system of claim 3, wherein the rapid thermal process chamber includes a viewport disposed laterally relative to the reflector plate, and the image acquisition device is oriented to acquire an image via the viewport that is representative of a perspective areal view of the reflector plate.

12. The system of claim 3, wherein the rapid thermal process chamber includes a lamp source, the system further comprising a controller that controls the lamp source to illuminate the reflector plate with radiation generated by the lamp source during the acquisition of the image.

13. A system for detecting the presence of a wafer fragment in a rapid thermal process chamber that includes a reflector plate, the system comprising:

an image acquisition device disposed to acquire an image representative of an area between a temperature sensing device and a wafer processing position within the deposition process chamber, wherein the acquired image is representative of at least a portion of the reflector plate;

and a processor that analyzes the acquired image to detect the presence of a wafer fragment within the area, wherein the processor is configured to drive the image acquisition device to generate a reference image by acquiring an image representative of at least a portion of the reflector plate at a time when the reflector plate is substantially free of wafer fragments, and is configured to compare the acquired image to a reference image, the processor generating an advisory in the event the presence of a wafer fragment is detected and the acquired image deviates from the reference image by more than a threshold deviation representative of the presence of a wafer fragment.

14. A rapid thermal processing system comprising:

a process chamber;

a wafer mount disposed within the process chamber;

a heat source disposed to heat a wafer in the wafer mount;

a reflector plate disposed on a side of the wafer mount opposite the heat source;

one or more temperature sensor probes disposed proximate to the reflector plate;

a viewport allowing visual access to the process chamber;

an image acquisition device disposed to acquire an image via the viewport, the image being representative of at least a portion of the reflector plate within the process chamber; and a processor that analyzes the acquired image to detect the presence of a wafer fragment on the reflector plate.

15. The system of claim 14, wherein the processor is configured to generate an advisory in the event the presence of a wafer fragment is detected.

16. The system of claim 15, wherein the processor is configured to compare the acquired image to a reference image, the processor generating the advisory in the event the acquired image deviates from the reference image by more than a threshold deviation representative of the presence of a wafer fragment.

17. The system of claim 16, wherein the threshold deviation is representative of the presence of a wafer fragment having a size that exceeds a threshold size.

18. The system of claim 16, wherein the processor is configured to drive the image acquisition device to generate the reference image by acquiring an image representative of at least a portion of the reflector plate at a time when the reflector plate is substantially free of wafer fragments.

19. The system of claim 16, wherein the act of comparing includes comparing the acquired image to the reference image on a pixel-by-pixel basis, and calculating an amount of the deviation based on differences between corresponding pixels in the acquired image and the reference image.

20. The system of claim 15, wherein the processor is configured to analyze the acquired image by identifying an optical density contrast change at a position within the imaged area, and determine whether a wafer fragment is present within the imaged area based on identification of the optical density contrast change.

21. The system of claim 15, wherein the processor is further configured to halt operation of the process chamber upon generation of the advisory.

22. The system of claim 14, wherein the processor is further configured to control the image acquisition device to acquire the image following exit from the chamber of a wafer processed within the chamber.

23. The system of claim 14, wherein the image acquisition device is oriented to acquire an image via the viewport that is representative of a perspective areal view of the reflector plate.

24. The system of claim 14, wherein the rapid thermal process chamber includes a lamp source, the system further comprising a controller that controls the lamp source to illuminate the reflector plate with radiation generated by the lamp source during the acquisition of the image.

25. A method for detecting the presence of a wafer fragment, which has broken away from a wafer during processing of the wafer in a deposition process chamber, the method comprising:

acquiring an image representative of a surface between a temperature sensing device and a wafer processing position within the deposition process chamber upon exit of the wafer from the deposition process chamber; and analyzing the acquired image to detect the presence of the wafer fragment on the surface.

26. The method of claim 25, wherein the deposition process chamber is a rapid thermal process chamber.

27. The method of claim 26, wherein the rapid thermal process chamber includes a reflector plate, and the image acquiring act includes acquiring an image representative of at least a portion of the reflector plate.

28. The method of claim 27, wherein the processor is configured to generate an advisory in the event the presence of a wafer fragment is detected.

29. The method of claim 28, further comprising analyzing the acquired image by comparing the acquired image to a reference image, and generating the advisory in the event the acquired image deviates from the reference image by more than a threshold deviation representative of the presence of a wafer fragment.

30. The method of claim 29, wherein the threshold deviation is representative of the presence of a wafer fragment having a size that exceeds a threshold size.

31. The method of claim 29, wherein the act of comparing includes comparing the acquired image to the reference image on a pixel-by-pixel basis, and calculating an amount of the deviation based on differences between corresponding pixels in the acquired image and the reference image.

32. The method of claim 28, further comprising analyzing the acquired image by identifying an optical density contrast change at a position on a surface of the reflector plate, and determining whether a wafer fragment is present on the reflector plate based on identification of the optical density contrast change.

33. The method of claim 28, further comprising halting operation of the rapid thermal process chamber in response to generation of the advisory.

34. The method of claim 27, wherein the chamber includes one or more temperature sensor probes disposed proximate the reflector plate, and the act of acquiring the image includes acquiring an image representative of at least a portion of the reflector plate, the acquired image being indicative of potential presence of a wafer fragment between the temperature sensor probes and the wafer processing position.

35. The method of claim 27, wherein the rapid thermal process chamber includes a viewport disposed laterally relative to the reflector plate, and the act of acquiring the image includes acquiring a perspective areal view image of the reflector plate via the viewport.

36. The method of claim 27, wherein the rapid thermal process chamber includes a lamp source that generates radiation to heat the chamber, the method further comprising illuminating the reflector plate with the radiation generated by the lamp source during the acquisition of the image.

37. A method for detecting the presence of a wafer fragment in a rapid thermal process chamber that includes a reflector plate, the method comprising:

generating a reference image by acquiring an image representative of at least a portion of the reflector plate at a time when the reflector plate is substantially free of wafer fragments;

acquiring an image representative of an area between a temperature sensing device and a wafer processing position within the rapid thermal process chamber, wherein the acquired image is representative of at least a portion of the reflector plate; and analyzing the acquired image to detect the presence of a wafer fragment within the area by comparing the acquired image to the reference image; and generating an advisory in the event the presence of a wafer fragment is detected and the acquired image deviates from the reference image by more than a threshold deviation representative of the presence of a wafer fragment.

* * * * *